(12) United States Patent
Schomburg et al.

(10) Patent No.: US 6,892,571 B2
(45) Date of Patent: May 17, 2005

(54) SENSOR FOR THE MEASUREMENT OF FLOWSPEEDS AND METHOD FOR OPERATING THE SAME

(75) Inventors: Werner Schomburg, Pfinztal (DE); Dirk Dittmann, Karlsruhe (DE); Klaus Schlote-Holubek, Karlsruhe (DE)

(73) Assignee: Forschungszentrum Karlsrue GmbH, Karlsruhe (DE)

( * ) Notice: Subject to any disclaimer, the term of this patent is extended or adjusted under 35 U.S.C. 154(b) by 0 days.

(21) Appl. No.: 10/716,937

(22) Filed: Nov. 20, 2003

(65) Prior Publication Data

US 2004/0159151 A1 Aug. 19, 2004

Related U.S. Application Data

(63) Continuation-in-part of application No. PCT/EP02/04323, filed on Apr. 19, 2002.

(30) Foreign Application Priority Data

May 21, 2001 (DE) .......................................... 101 24 964

(51) Int. Cl.⁷ ............................................... G01F 1/68
(52) U.S. Cl. ................................ 73/204.17; 73/204.22; 73/861.74
(58) Field of Search ......................... 73/204.17, 204.26, 73/204.22, 861.74, 861.75, 861.71

(56) References Cited

U.S. PATENT DOCUMENTS 4,651,564 A * 3/1987 Johnson et al. .......... 73/204.26
4,912,974 A 4/1990 Inada et al.

FOREIGN PATENT DOCUMENTS

WO  WO 01 18500  3/2001

OTHER PUBLICATIONS

T. Matsura et al., "Deformation Control of Microbridges For Flow Sensors" Sensors and Actuators A, Bd. 60, No. 1–3, May 1, 1997, pp. 197–201.

* cited by examiner

*Primary Examiner*—Harshad Patel
(74) *Attorney, Agent, or Firm*—Venable LLP; Robert Kinberg; Thomas G. Wiseman

(57) ABSTRACT

A sensor for measuring a flow speed of a fluid medium includes a housing with a carrier membrane disposed in the housing and being essentially in a form of a vane having a circumference and at least one edge region. Holding elements are arranged over a portion of the circumference connecting the vane to the housing so that only the at least one edge region of the carrier membrane is subjected to mechanical stress caused by the housing. An electrically conductive track with feed lines is installed on the carrier membrane in a region of a neutral fiber for the carrier membrane which does not experience a mechanical strain when the carrier membrane is bent. The electrically conductive track is adapted for being heated relative to the environment by an electrical current flowing through the electrically conductive track.

5 Claims, 2 Drawing Sheets

SENSOR FOR THE MEASUREMENT OF FLOWSPEEDS AND METHOD FOR OPERATING THE SAME

CROSS-REFERENCE TO RELATED APPLICATION

This is a continuation-in-part of International Application No. PCT/EP02/04323 filed Apr. 19, 2002, designating the United States and claiming priority with respect to Application No. 101 24 964.0 file in Germany on May 21, 2001, the disclosures of both foregoing applications being incorporated herein by reference.

BACKGROUND OF THE INVENTION

The invention relates to a sensor for measuring fluid flow speeds.

Various design options for sensors used to measure fluid flow speeds are disclosed in an G. Stemme, "Micro Fluid Sensors and Actuators," *Proceedings for the 6th International Symposium on Micro Machine and Human Science*, pages 45–52, 1995. Among other things, it is described how a conductive track, installed on a thin membrane, is maintained at a constant temperature with the aid of an electrical current and the energy for maintaining the temperature is used for measuring the flow speed. More detailed descriptions of how to operate such a sensor can be found in the book *STRÖMUNGS—UND DURCHFLUSSMESSTECHNIK* [*Flow and Flow-Through Measuring Technology*], by Otto Fiedler, pages 159–163, House of Oldenbourg, publishers, 1992.

The article by W. K. Schomburg et al titled "AMANDA—Surface Micromachining, Molding, and Diaphragm Transfer," published in the magazine *Sensors and Actuators A*, Volume 76, pages 343 to 348, describes a sensor for measuring flow speeds by measuring the pressure drop above a capillary with a pressure sensor. The pressure drop is proportional to the flow speed and can therefore be used for measuring the flow speed. The pressure sensor used in this sensor comprises strain gauges that are installed on a thin membrane.

The disadvantage of both above-described methods for measuring flow speeds is that forces acting from the outside upon the sensor housing, as well as thermal strains of the housing itself as a result of changes in the environmental temperature, can strain the conductive track so that its electrical resistance changes, thus simulating a changed flow speed.

SUMMARY OF THE INVENTION

It is an object of the invention to provide a sensor for measuring fluid flow speeds for which forces and temperature changes that are effective from the outside, influence the sensor signal only to a very small degree.

The above and other objects are accomplished according to the invention by the provision of a sensor for measuring a flow speed of a fluid medium, comprising: a housing; a carrier membrane disposed in the housing and being essentially in a form of a vane having a circumference and at least one edge region; holding elements arranged over a portion of the circumference connecting the vane to the housing so that only the at least one edge region of the carrier membrane is subjected to mechanical stress caused by the housing; and an electrically conductive track with feed lines installed on the carrier membrane in a region of a neutral fiber for the carrier membrane which does not experience a mechanical strain when the carrier membrane is bent, the electrically conductive track being adapted for being heated relative to the environment by an electrical current flowing through the electrically conductive track.

BRIEF DESCRIPTION OF THE DRAWINGS

The invention is described in the following in further detail with the aid of the following Figures of two exemplary embodiments for the design of, two sensors. The Figures are not drawn to scale, so that very thin and/or small structures can be shown clearly next to comparably large structures.

DETAILED DESCRIPTION OF THE INVENTION

Figure 1:
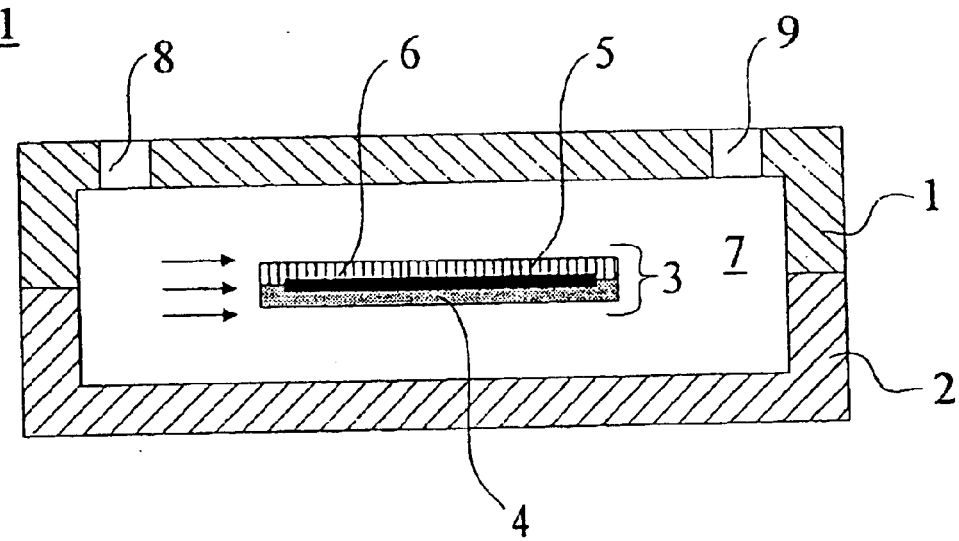
FIG. 1 is a sectional view of a first exemplary embodiment of a sensor according to the invention.
Figure 2:
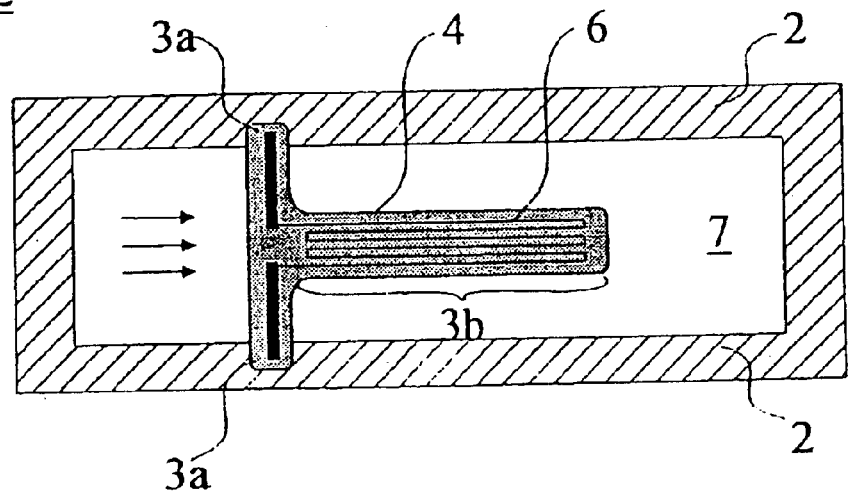
FIG. 2 is a sectional view along lines 2—2 in FIG. 1.

Referring TO FIGS. 1 and 2, there is shown a first exemplary embodiment of the sensor according to the invention in which a tongue-shaped membrane structure is suspended freely inside a cavity. A membrane structure 3 is mounted inside a cavity 7, formed with an upper housing half 1 and a lower housing half 2. Membrane structure 3 consists of two layers 4 and 5, with a conductive track 6 installed in-between, as shown schematically in the sectional view from above in FIG. 2. The meandering conductive track shown herein can also have a different design, for example a bifilar spiral, which has the advantage of reducing the antenna qualities of conductive track 6. The housings halves are preferably produced from polysulphone material and are respectively provided with a fluid inlet 8 and a outlet 9. The configuration of the inlet and outlet can also differ from the one shown herein, for example they can be arranged diametrically opposite one another Membrane layers 4 and 5 are produced from polyamide and conductive track 6 from platinum. Membrane layers 4 and 5 respectively can have a thickness of only approximately 1 $\mu$m and the conductive track 6 can have a thickness of only approximately 100 nm. As a result, the heat capacity of membrane structure 3 is very low and its temperature can adjust quickly to a temperature of the medium that fills cavity 7. Conductive tracks 6 can have a width of approximately 7 $\mu$m and a length of between 1.9 and 34.7 nm, for which the electrical resistance ranged is between 100$\Omega$ and 10 k$\Omega$. The outside dimensions of the housing in this example measure 5.5·4.5·1.2 mm$^3$.

A medium flowing past the conductive track 6 cools the conductive track 6, wherein the cooling capacity depends on the flow speed. The electrical resistance of the conductive track 6 is proportional to its temperature, which is the reason why the resistance changes in dependence on the flow speed.

As a result of being very thin and the low heat capacity associated therewith, membrane structure 3 can heat up very quickly as a result of the electrical current flowing through conductive track 6 and can also cool down again quickly to the temperature of the medium filling cavity 7 once the current is turned off. This permits a temperature-independent flow measurement with only one conductive track 6 but has the disadvantage that mechanical forces and stresses acting upon the housing from the outside, for example those caused by temperature changes in housing halves 1 and/or 2, lead to strains in membrane structure 3 that change the resistance in conductive track 6 and thus hinder the flow speed measurement.

Membrane structure 3 includes webs 3a and a membrane component 3b supporting the sensitive part of conductive track 6. Membrane structure 3 is connected with the aid of webs 3a to the housing half 1 and/or 2. Mechanical stresses and forces that act upon the housing from the outside can thus cause only insignificant strains in membrane component 3b of which comprises the sensitive part of conductive track 6. As a result, it is avoided that strains in the conductive tracks cause changes the electrical resistance of conductive track 6 which could interfere in an undesirable manner with the sensor signal.

In place of the webs 3a, it is also possible to provide a fixed component in at least one of the housing halves 1 or 2 for attaching the component 3b of the membrane structure.

Polyamide layers 4 and 5 are produced with the same thickness, insofar as technically possible, so that the conductive track 6 comes to rest in the center of the membrane structure 3, on the so-called neutral fiber that is not strained during the bending of the membrane structure 3. For example, membrane structure 3 can bend if the medium flowing through cavity 7 results in a type of fluttering movement of membrane structure 3, such as is known from flags.

Flow measurements of between 100 µl/min and 500 ml/min were taken in cavities 7 having a cross section of 390·240 µm². The measuring range can be changed by adapting the cross section. For very low flow rates the limitation consequently results that a very narrow cross section of cavity 7 increases the danger that particles or gas bubbles contained in the medium close off cavity 7 completely or partially and thus interfere with the measuring results. Typically, cross sections of 100·100 µm² can still be used. However, cross sections of 10 10 µm² are still suitable if very pure mediums are used, for example when measuring out medications.

The flow rate of water was measured with the above-described sensor of between 4 µl/min and 200 µl/min. This measurement was made possible by calibrating the sensor through weighing, wherein suitable standard testing means were used for calibrating the gas operation. In contrast to liquid mediums, gas mediums require electrical capacities that are reduced by a factor of 10 for actuating the conductive track 6.

The tongue-shaped part 3b of membrane structure 3 retains its shape even if the flow is directed away from the suspension 3a of the membrane structure and not in the direction as indicated by the arrows in FIG. 2. However, a tongue-shaped part 3b of the membrane structure 3 can be folded over or bent by a flow directed toward the suspension if the flow speed exceeds a critical value. A folded over or bent part 3b of the membrane structure 3 can lead to incorrect measuring values for the flow speed and should therefore be avoided. This can be achieved through a limitation of the possible flow speed or a determination of the flow direction, for example with the aid of a passive valve. Another option is the use of a different suspension design for membrane structure 3, as shown in the second exemplary embodiment illustrated in FIGS. 3–4 as described below.

It is also possible to install two sensor elements side-by-side in separate cavities 7 and to ensure with the aid of upstream connected, passive valves that the flow through one of the cavities is always only in one direction while the flow through the other cavity is always in the opposite direction. Tongue-shaped parts 3b of the membrane structure 3 in that case can always be aligned corresponding to the flow direction. In addition, an arrangement of this type also makes it possible to detect the flow direction by determining which sensor has responded.

Figure 3:
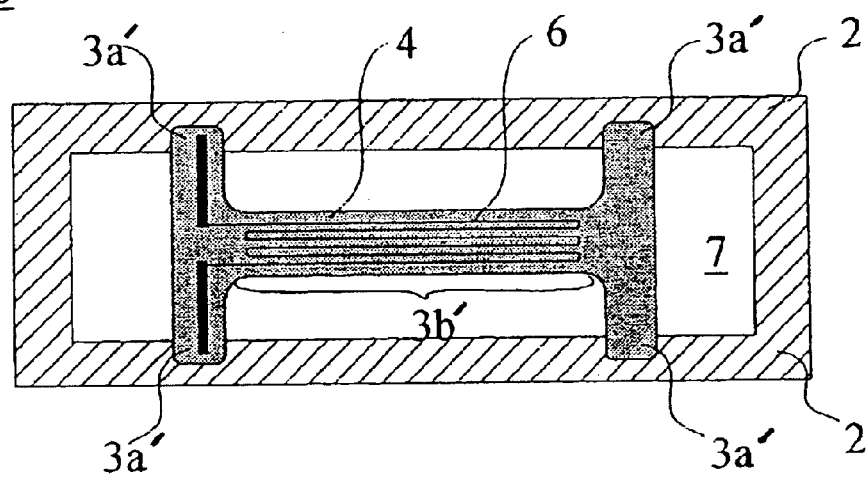
FIG. 3 is a sectional view of a second exemplary embodiment of a sensor according to the invention.
Figure 4:
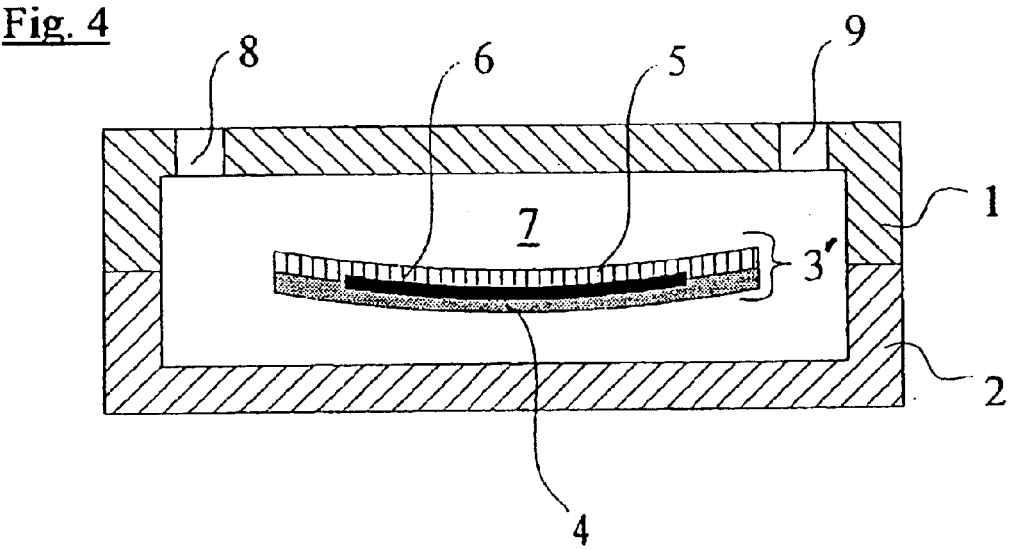
FIG. 4 is a sectional view along lines 4—4 of FIG. 3.

A second exemplary embodiment is shown in FIGS. 3–4, wherein the membrane structure 3 of a sensor is suspended from four webs 3a.

FIG. 3 shows a membrane structure 3', having conductive tracks 6 made of gold, which is connected via four webs 3a' to housing half 1 and/or 2. The advantage of this embodiment is that part 3b' of the membrane structure 3' cannot fold over or bend if the flow direction is reversed. On the other hand, it is important with this embodiment that the webs 3a' of the membrane structure 3' are flexible enough, so that they do not, or only to an insignificant degree, transfer mechanical stresses caused by the housing to the part 3b' of the membrane structure.

For a different transfer option of mechanical stresses from the housing to membrane structure 3', membrane structure 3' essentially has a loose design and sags to some degree inside the cavity 7, as shown in FIG. 4. If a housing strain is transferred to such a membrane structure 3', only the degree by which the membrane structure 3' sags will change, without this resulting in an essential change in the mechanical stress of the membrane.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A sensor for measuring a flow speed of a fluid medium, comprising:

a housing;

a carrier membrane composed of a polymer and disposed in the housing and being essentially in a form of a vane having a circumference and at least one edge region;

holding elements arranged over a portion of the circumference connecting the vane to the housing so that only the at least one edge region of the carrier membrane is subjected to mechanical stress caused by the housing; and an electrically conductive track with feed lines embedded within the carrier membrane in a region of a neutral fiber for the carrier membrane which does not experience a mechanical strain when the carrier membrane is bent, the electrically conductive track being adapted for being heated relative to the environment by an electrical current flowing through the electrically conductive track.

2. The sensor according to claim 1, wherein the carrier membrane comprises two layer and the conductive track is disposed between the two layers, the two layers being composed of the same material and having the same thickness so that the neutral fiber which is not subject to stress if the carrier membrane is bent is positioned between the two layers.

3. The sensor according to claim 1, wherein the electrically conductive track comprises a metal.

4. The sensor according to claim 1, wherein the housing includes a fluid inlet and a fluid outlet arranged so that the fluid medium flows essentially parallel to a plane of the carrier membrane.

5. The sensor according to claim 1, wherein the carrier membrane is secured to the housing at four points and has a slight sag.

* * * * *